INVENTOR
ROBERT LENZ, DECEASED,
BY AENNE LENZ, ADMINISTRATRIX

BY Jacob L. Kollin
Attorney

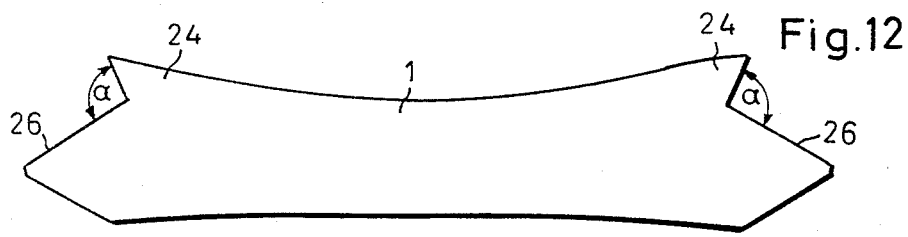
Fig. 12
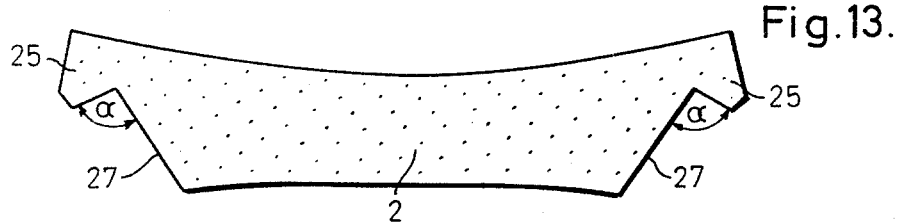
Fig. 13.
Fig. 14.
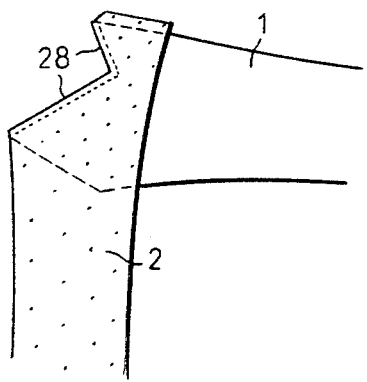
Fig. 15.
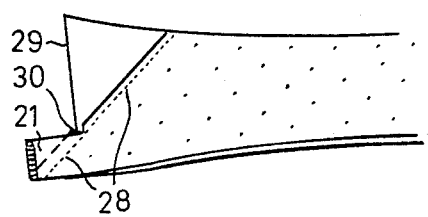
Fig. 16.
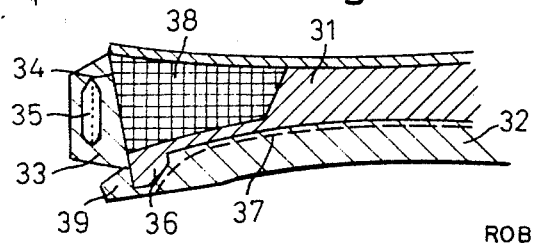
INVENTOR
ROBERT LENZ, DECEASED,
BY AENNE LENZ, ADMINISTRATRIX

INVENTOR
ROBERT LENZ, DECEASED,
BY AENNE LENZ, ADMINISTRATRIX

BY *Jacob L. Kollin*
Attorney 3,448,461
COLLAR, PARTICULARLY A TOP COLLAR
Robert Lenz, deceased, late of Krefeld, Germany, by
Aenne Lenz, sole heiress and administratrix, Maternusstrasse 29, Roden-Kirchen, near Cologne, Germany
Filed Aug. 4, 1965, Ser. No. 477,330
Int. Cl. A41b 3/00
U.S. Cl. 2—131                                        2 Claims

ABSTRACT OF THE DISCLOSURE

A collar formed by an outer fabric covering and an insert. the covering is folded and folded over both sides of the insert. A longitudinal stitch is made along the fold and one or more cross-stitches through the covering and the insert.

---

Figure 1:
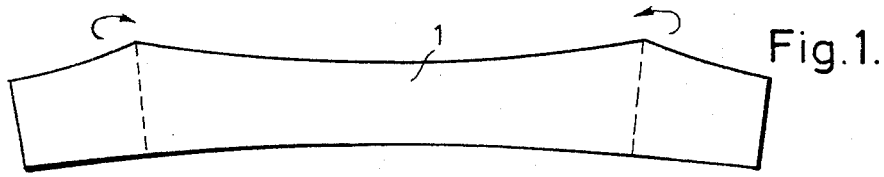

In applicant's German Patent 1,039,961, there is disclosed a collar in which the bulky parts along the front edges and the lower edge are avoided by a simple turning around the top and under fabrics to the side edges of the interlining, which later form the front edges of the collar, as well as around the lower edge of the interlining which later form the lower edge of the collar, while the connection of the top and under fabric is covered by a quilted stitch along the collar's lower edge as well as on the inner side of the collar.

Following this teaching the new non-iron fabrics, known under the trademarks "Nylon and "Perlon" can be used with good results. Of late, these fabrics are being superseded more and more by boil-proof and no-iron fabrics making a change in the method of collar manufacturing practical. When using these new fabrics in manufacturing it has been found that the turning around of the top-and under-fabric in the interlining along the lower edge without a connection to the interlining is impossible, except when the collar is being stitched (quilted) again in known manner, whereby the advantage of a seamless front side, an advantage among others resulting from the teaching of the above mentioned older patent of the applicant, will be lost.

The present invention solves the problem of economical manufacture of a collar suitable for all kinds of fabrics and for all purposes while incorporating the advantages of the German Patent 1,039,961 and, furthermore, permits the use of boil-proof no-iron fabrics.

This is achieved, according to the invention, by a top fabric covering which consists of one of several cuts which result from turning around and sewing together from the sides by at least one cross-seam, which covers the interlining on both sides and is sewn together with its lower edge of the collar's selvedge to the under edge selvedge of the interlining.

In addition to this connection seam between covering and interlining, another connecting seam between the two top fabric layers is possible.

The interlining can be of one piece or with another interlining or with several, sewn or pasted together, whereby these further interlinings can have protruding parts over the subsequent collar front edges which will be turned around the interlining along the collar front edges. The collar according to the invention, is simple in design and extremely economical in manufacture. By this special way of fastening the top fabric covering to the interlining, the collar is protected against distortion along the collar under edge binding, and by thus boil-proof. Furthermore, the bulky parts along the collar's front edges and the collar's lower edge are avoided. The design according to the invention is applicable to any collar model and any collar cut.

The manufacture of such a collar or top collar is carried out in such a way that the preferably one piece top fabric cut for the top and underside of the collar is connected to the narrow sides by at leàst one cross-seam, then folded up to the top fabric covering for the interlining cut and fastened to its collar under edge selvedge by a method known subsequently as a "mirror image" method with a seam on the collar under edge of the lining. Subsequently, the covering is turned over the lining, after which, in known manner the sewing onto the shirt or undercollar is performed, which may be manufactured in the same way. Should difficulties arise when sewing together reverse sides along the top of each lining two longside ribs still open top-fabric-covering to the collar's under edge selvedge of the interlining by trainees or helpers, which do not arise with skilled labor, both fabric layers of the top fabric covering may be stitched together by a seam along the collar's under edge in such a way that the top-fabric covering on that side where it is sewed on the reversed under edge rib of the collar to the interlining, will show a connecting seam so that the sewing to the interlining only needs to be done along the already existing connecting seam.

The invention is suitable for a one-piece collar on which the top collar and the under collar neckbands are not manufactured separately and then sewn together along the fold-edge, but form one unit right from the beginning. This one-piece collar has many advantages, e.g. only one interlining cut and, optimum, only one top fabric cut. The sewing together of the top collar and under collar is unnecessary, thus saving labor. On the other hand, it is difficult to manufacture such a collar, because the insets of the buttonhole and button flaps are cut in and have to be sewn, using a "quilted stitch" to the other cut, which causes ugly distortions and bulky parts on the collar points. Additionally, the bulky parts of the collar beaks and the ugly quilted stitch is visible from the front.

It is therefore particularly important that all these disadvantages be eliminated.

Additionally, another form of the top fabric cut may be employed, consisting of one or more parts, for the top and under side of the one-piece collar from which the sewing side to the shirt or the sewing together side of the collar forming under edge, can be cut in on two points triangle-wise with an angle of about 95°, whereby the angle points fall into the subsequent front edges of the collar. The separately cut flap parts are sewed-in in these cut-outs. Moreover, these seams are so far back that they cannot be seen from the front after the turning around of the top collar over the fold edge on the under collar. The flap beaks lie flat and do not show the quilted stitch. Since the beaks are turned around when sewed to the shirt or, when stitched over in front, the stitched part remains thin. Formerly, the fold edges have been thick, so that at the beginning as well as at the end of these seams bulky joints appeared.

This execution can further be improved according to the invention in that the two separate cuts for the collar beaks and with it additional labor for the cutting as well as for the sewing are dispensed with. Furthermore, where the tie is being put into the collar, no seams are visible at the collar beak points, and the cut-in corners for the collar beaks along the backside cross-seams which connect the cut-up for the top fabric covering are behind the front edges of the collar.

For this purpose those top fabric parts which form the collar-beaks are cut in the top fabric covering of different lengths, whereby the cuts for the top side of the collar beaks are kept in different sizes against those for the underside and in such a way that the edge brims of the top-fabric cuts joining the side edges form a nearly equal angle with those.

With these equal angle edges the cuts of the top and underside are first placed, each on top of the other, and then sewn together with a continuous seam and placed again on top of each other on the other side and sewn together. Next, the top fabric covering is finished. Thus, the button and buttonhole beaks are always of the same length and after finishing need no examining, one side need not be compared with the other for equal length or straightened, if the lengths are different.

Then, this top fabric covering, as described above, can be sewn, its rib at the collar under edge, to the under edge rib of the interlining which is reversed.

This sewing together of the top fabric covering with the interlining is done advantageously in a different way. In this case a multi-piece interlining is more practical. It consists of a basic interlining and one more interlining for the top-collar form (pattern) which are secured to each other preferably by pasting. The basic interlining provides protrusions on both sides which form the pattern of the collar beaks. Along the collar's front edges one protrusion can be provided which overhangs the form giving interlining by about 40 mm. Further, the basic interlining on the under edge of the collar is about 8 mm. wider than the form interlining. On this complete interlining the covering is put on top of the under edge and both sewn together by a seam spaced 4 mm. from the form giving interlining. The fixed covering with its basic interlining under edge, which lies about 8 mm. below the form interlining is then beaten against the latter. A space of about 4 mm. in width is thus formed between the sewed on covering and the form interlining which permits, without touching the collar covering, fastening with a small seam the turned over basic interlining at the collar under edge to the form interlining. This seam prevents the backside fabric from protruding over the collar under edge of the completed collar. Before turning the collar, the part of the basic interlining which may protrude over the front edge of the collar, if at all, can be beaten to the inner side i.e. to the form interlining after it has been provided with bones. This method prevents the wear and tear of the collar points, since the covering does not touch the edge of the sharp form interlining which is important with regard to all poplin fabrics.

In another embodiment the form interlining may be spread out with regard to the folded edge of the collar, but goes into the under-collar at the ends of the front-collar. Thus when the top-collar is turned around into the fold edge on the collar front edge a unique fine rounding for a tie is formed.

The form interlining can be reinforced by special adhesive wings. The under-collar can also be furnished with an adhesive strip. This is important with regard to cotton fabrics (poplin).

For nylon and Perlon fabrics no protrusions of the basic interlinings at the collar's front edge have to be provided and no adhesive strip is necessary in the undercollar.

These advantages described with regard to the one-piece collar can also be had in the two-piece collar, especially the forming of the covering of the top fabric, the fixing of the covering to the basic interlining under-edge, the fitting out of the basic interlining with an adhesive lining to form the pattern of the collar and which can be reinforced by adhesive wings, the turning around of the basic interlining under-edge which is sewn to the covering towards the adhesive interlining and the securing of a small band.

It is also possible to make the basic interlining on the under-edge of the collar not only 8 mm. wider than the form-giving interlining but have it cut even with it.

In the drawing there are shown three examples demonstrated. In the example of FIGS. 1–6, the manufacture of a top-collar is described; in FIGS. 7–11 the manufacture of a one-piece collar and in FIGS. 12–20 another way of manufacturing a one-piece collar.

Figure 2:
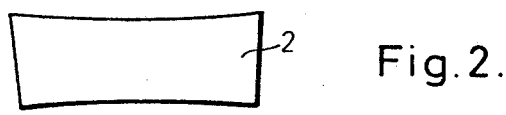
Figure 3:
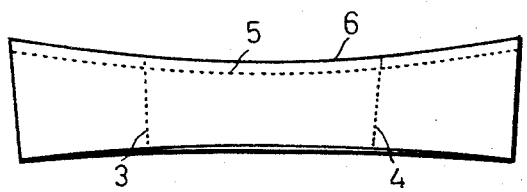
Figure 4:
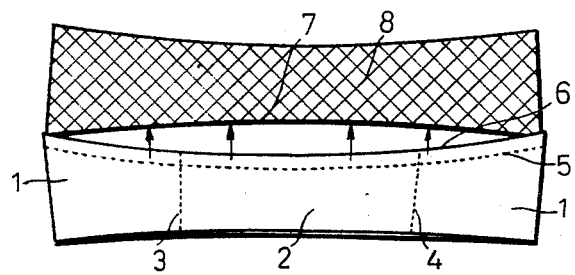
Figure 5:
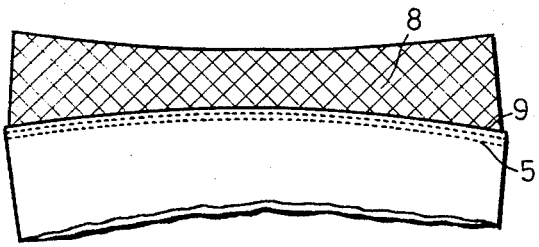
Figure 6:
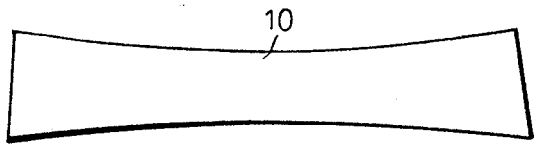
Figure 7:
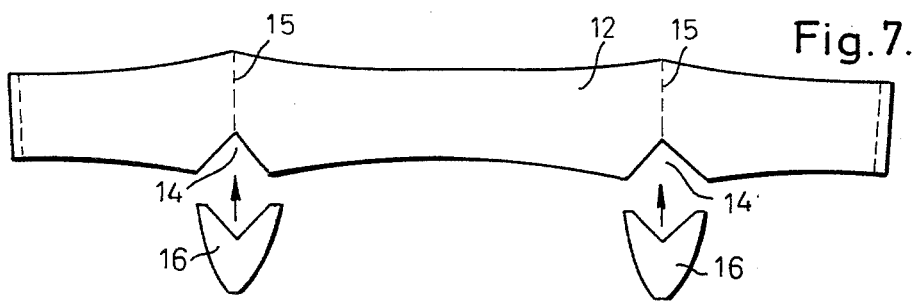
Figure 8:
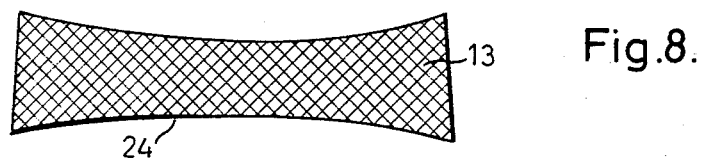
Figure 9:
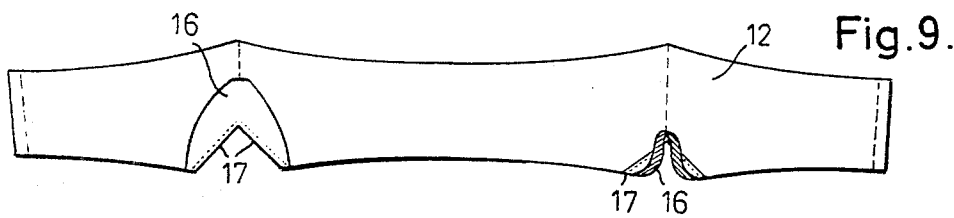
Figure 10:
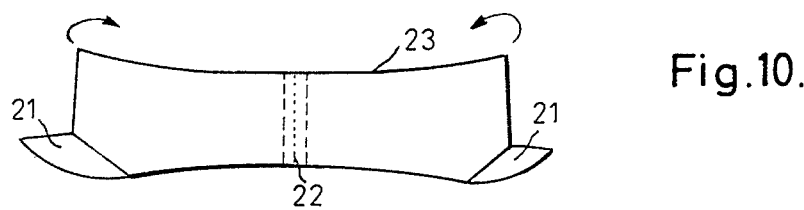
Figure 11:
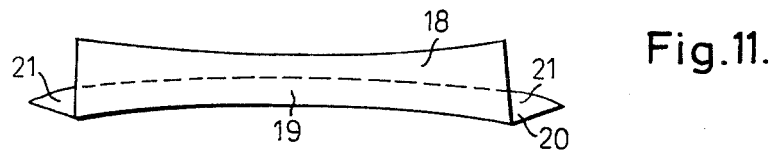
Figure 17:
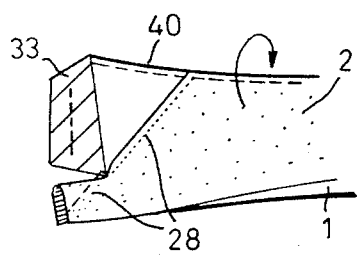
Figure 18:
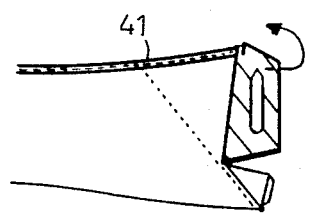
Figure 19:
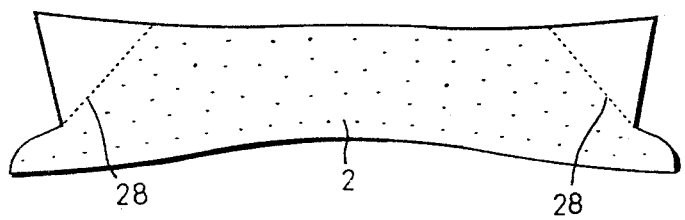
Figure 20:
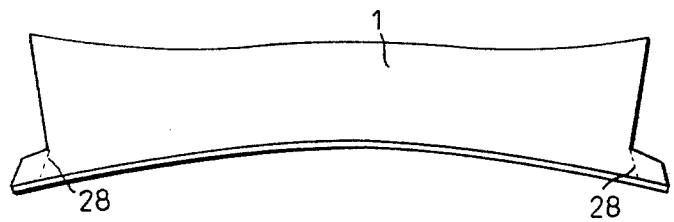

In the drawing:

FIG. 1 is the spread-out top fabric cut for the top side and parts of the underside of the top collar;

FIG. 2 the spread-out top fabric cut for the rest of the underside of the top collar;

FIG. 3 the top covering sewn across seams;

FIG. 4 the putting on of the parts in preparation for the connecting seam between the top fabric covering and interlining;

FIG. 5 the condition after execution of the connecting seam;

FIG. 6 the finished top collar after turning but before sewing on the under collar or the neckband;

FIG. 7 the spread out top fabric cut for the top and underside of a one-piece collar, with the cuts for the flaps;

FIG. 8 the interlining cut, also spread out;

FIG. 9 the spread-out top fabric cut with the sewn on flaps;

FIG. 10 the top fabric covering for the interlining formed by sewing together of the two small cut ends and by folding together;

FIG. 11 the finished collar with the top collar turned around the fold edge unto the undercollar;

FIG. 12 the top-fabric cut for the collar outerside for another one-piece collar execution;

FIG. 13 the top-fabric cut for the collar's innerside of the one-piece collar of FIG. 12;

FIG. 14 the condition during the manufacture of the connecting seam between the two top-fabric cuts, as shown in FIGS. 12 and 13;

FIG. 15 the inside of the top fabric covering manufactured according to FIG. 14;

FIG. 16 the interlining;

FIG. 17 the condition while sewing the top fabric covering to the interlining;

FIG. 18 the condition after turning the sewn-on top fabric covering around the interlining;

FIG. 19 the collar inner side after turning the top fabric covering over the interlining and before sewing on to the shirt and FIG. 20 the collar outerside after turning the top fabric covering over the interlining, corresponding to FIG. 19.

The example in FIG. 1–6 a top-fabric cut 1 is provided for the top side of the collar which is cut longer than the collar (FIG. 1). Accordingly, the top-fabric cut 2 for the underside of the collar is cut smaller (FIG. 2). This cut can also be made as a multi-piece. FIG. 3 shows that these cuts 1 and 2 connect at the back with crossing quilted stitches 3 and 4, thus forming a top-fabric covering. Next, the two fabric layers, one on top of the other, are sewn together at the under-edge with seams 5, which are spaced from cut 6, e.g. at a distance of about 7 mm. Now, this covering FIG. 4 is placed with its under edge side in a reversed manner to under edge 7 to the collar-under-edge, of the interlining cut 8 thus giving it form. Next, the covering is put on top of the interlining 8 along the under edge, as shown by arrows in FIG. 4 and sewed to interlining 8 with seam 9 (FIG. 5). Thus, seam 9 is parallel to seam 5 and the space between it and cut-edge 6. The first seam 5 closing the covering and the underside will only facilitate the sewing together of covering and interlining. This seam is unnecessary as soon as the personnel is skilled enough to sew on the covering, with the underside open and consequently without seam 5, directly with seam 9 to the interlining. As soon as the connection with the undersides, placed in reverse, one on top of the other, of the interlining and covering has been made, the latter (FIG. 5) is turned from its position over interlining 8 and the collar form is attained, as shown in FIG. 6, which is then along top-edge 10 with the under-collar the neckband.

In the example of FIGS. 7–11 there is provided a one-piece top fabric cut 12 for the top and underside of the one-piece interlining cut 13. This, too, may consist of several parts. The top fabric cut 14 is cut out with an angle somewhat larger than 90°, in such a way that its point is placed on the dotted line 15, which will always form one of the subsequent collar front edges. In these cutouts the two cuts 16 for the button hole or button flaps are sewn as per FIG. 9. In consequence the seams 14 are so far back that, if the finished one-piece collar with its top collar 18 is folded along fold edge 19 over the under collar 20, no seams can be seen from the front on the flaps 21 (FIG. 11). The joining of the top fabric cutout 12 to the covering of the interlining 8 on both sides is done by seam 22 (FIG. 10), by folding together the two free side ends to the collar back side and is thus invisible from the front, as described in the other example. Also, the sewing together of the reversed pieces to each other under edge 23 of the top-fabric covering to the under edge 24 of the interlining is done as previously described prior as well as during the further course of execution.

FIGS. 12–20 describe the development of another one-piece collar, according to the invention;

FIG. 12 shows the top fabric cutout 1 for the collar top side of the one-piece collar in which top and under-collar form an undivided whole;

FIG. 13 shows the top fabric cut 2 for the back side or underside of the complete collar. These top fabric cuts show the salient parts 24 and 25 cut according to the invention, for the subsequent button and buttonhole flaps, which when put together in position, form the beaks. The top fabric cut for the collar top side 1 has to be longer than the top fabric cut 2 for the underside of the collar. The cut-top fabric parts 24 and 25 for the beak flaps are of different sizes.

Both top fabric cuts are then sewn together with two cross-seams. The pattern of these cross-seams corresponds to the side-edges 26 and 27 of both cuts which, according to the invention, run at equal angles. To form the top fabric parts by sewing together the two top fabric cuts, FIGS. 12 and 13, these are at an angle to the side edges 26 and 27 (FIG. 14) placed on top of each other and sewn together by a through seam 28 first on one side and then on the other. Thus the top fabric covering is closed on both side edges (FIG. 15), with the cross-seam 28 running on the back-side of the collar, invisible from the front.

This covering is cut in at about the height of the crossing of the collar front edges 29 in the beak-flaps 21 in known manner up to seam 28 (30).

FIG. 16 shows an interlining which can be manufactured in another way, especially as a one-layer interlining. In this example the interlining consists of the form of the top collar interlining 31, as well as of a larger base interlining 32. The form interlining 31 is connected with a base interlining, preferably by pasting. This base-interlining 32 is furnished at the sides with salient parts 33, which preferably overhang at about 40 mm. the side edges of the form interlining 31. These two salient parts are thrown off along the side-edges 34 on the form interlining, as will be shown later, preventing the wear and tear of the top fabric at the front edges. These salient parts 34 additionally can be reinforced with pasted-on or stitched-on collar bones 35.

The base-interlining 32 is about 8 mm. wider along the underedges than the form interlining 31. The latter has a strap 36 on both sides, extending into the base interlining of the under collar which creates a perfect rounding in the fold edge between the top and under collar of the completed collar, thus giving the tie a perfect hold.

In the back within the range of the under-collar a strip 37 is pasted to the base interlining, which is important if the top fabric covering is made of cotton material. Besides, the interlining is reinforced from the front edges backwards at a certain length by pasted on strips 38. For the base interlining, parts 39 can be cut, which in addition will provide form for the button or buttonhole flaps. On such an interlining as shown in FIG. 17, the covering of FIG. 15 is attached under edge on top of an under edge, on the interlining and sewn together along the under edge about 4 mm. distant to the under-edge of the form-giving interlining (40). The thus fastened top-fabric covering is then (FIG. 17), turned around the under edge to the back side of the interlining, as show in FIG. 18. Thus a small space of about 4 mm. in which results between the sewed-on top fabric covering and the form interlining, along which by means of a small seam 41, the turned-over base interlining at the collar lower edge is sewn together with the form interlining. This small seam runs without any touching of the top fabric covering. It serves to prevent the protruding of the backside top fabric over the collar's under edge of the finished collar.

The collar is finished by folding around the salient parts 33 as indicated in FIG. 18, along the front edges of the form interlining 31, the top fabric covering is turned around the interlining, thus covering the interlining from both sdes with a top fabric.

The thus completed collar is shown in FIGS. 19 and 20. FIG. 19 shows the backside of the collar with the transversely running connecting seams of the two top fabric cuts which as shown in FIG. 20, is invisible from the front on the outside of the collar. Both figures show moreover, that within the range of the button and buttonhole flap the connecting seam of the two cut-in beak flap cuts is disposed on the side which is not visible from the front on the finished collar where the tie is worn. No seam is to be seen, which is an essential advantage of the collar according to the invention.

What is claimed is:

1. As an article of manufacture, a collar comprising, in combination, an interliner, an outer fabric covering both sides of said interliner, said covering consisting of a blank having a first portion shorter than the length of the collar and a second portion longer than the length of the collar, the ends of said second portion being folded over the ends of said interliner and overlapping the ends of said first portion, lines of stitching securing the ends of said second portion to the ends of said first portion, a line of stitching securing the lower end of the outer fabric covering along a longitudinal line with the lower edge of the interliner and turned over the interliner.

2. The collar according to claim 1, wherein said folded over ends of said second portion define fold lines at the ends of said collar and further provided with angular cutouts of 90°–100° in the area of said fold lines, button and buttonhole flaps, stitching securing said button and buttonhole flaps to the edges of said collar, defining said angular cutouts.

References Cited

UNITED STATES PATENTS 3,132,347   5/1964   Light _____ 2—132
3,283,337   11/1966  Dawes et al. _____ 2—132 XR JAMES R. BOLER, *Primary Examiner.*